US010528517B1

(12) United States Patent
Kumar et al.

(10) Patent No.: US 10,528,517 B1
(45) Date of Patent: Jan. 7, 2020

(54) SYSTEMS AND METHODS FOR POWER CONSERVATION IN A SOUNDWIRE AUDIO BUS THROUGH PATTERN RECOGNITION

(71) Applicant: QUALCOMM Incorporated, San Diego, CA (US)

(72) Inventors: Sandeep Kumar, Navi Mumbai (IN); Suman Kumar, Bangalore (IN); Lior Amarilio, Yokneam (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/059,651

(22) Filed: Aug. 9, 2018

(51) Int. Cl.
*G06F 13/42* (2006.01)
*G06F 13/24* (2006.01)
*G06F 13/364* (2006.01)

(52) U.S. Cl.
CPC .......... *G06F 13/4291* (2013.01); *G06F 13/24* (2013.01); *G06F 13/364* (2013.01)

(58) Field of Classification Search
CPC combination set(s) only.
See application file for complete search history.

(56) References Cited

U.S. PATENT DOCUMENTS

| 6,018,304 | A | 1/2000 | Bessios | |
| 8,514,994 | B1 * | 8/2013 | Lee | H03K 19/1737 375/354 |
| 9,252,900 | B2 | 2/2016 | Poulsen | |
| 9,436,633 | B2 | 9/2016 | Segev et al. | |
| 9,626,981 | B2 | 4/2017 | Chesney | |
| 9,779,465 | B2 | 10/2017 | Kim et al. | |
| 10,359,827 | B1 | 7/2019 | Amarilio et al. | |
| 2007/0283182 | A1 * | 12/2007 | Defazio | G11C 7/1012 713/500 |
| 2009/0055005 | A1 * | 2/2009 | Oxman | G10L 19/16 700/94 |
| 2009/0129505 | A1 * | 5/2009 | Ware | G06F 13/4243 375/316 |
| 2009/0310433 | A1 * | 12/2009 | Caltagirone | G06F 13/4291 365/233.13 |
| 2012/0278646 | A1 * | 11/2012 | Gruber | G06F 13/4291 713/400 |
| 2014/0244884 | A1 * | 8/2014 | Segev | G06F 13/36 710/305 |

(Continued)

FOREIGN PATENT DOCUMENTS

EP  2775654 A1  9/2014

*Primary Examiner* — Raymond N Phan
(74) *Attorney, Agent, or Firm* — Withrow & Terranova, PLLC

(57) ABSTRACT

Systems and methods for power conservation in a SOUND-WIRE audio bus provide a pulse density modulated (PDM) audio stream at an audio source to an encoder. The encoder has a plurality of encoding states corresponding to bit patterns. The encoder compares bits of the audio stream to available bit patterns and selects an encoding state. The audio source sends the encoding state to an audio sink and then sends data to the audio sink based on encoding using the selected encoding state. The data is sent over a non-return to zero inverted (NRZI) audio bus. As the audio stream changes bit patterns, the encoder may select different more efficient encoding states and provide updates to the audio sink of changes in the encoding state.

21 Claims, 10 Drawing Sheets

(56) References Cited

U.S. PATENT DOCUMENTS

2016/0124892 A1\* 5/2016 Amarilio ............ G06F 13/4282
  710/110
2016/0306382 A1\* 10/2016 Amarilio ................ G06F 1/06
2016/0366206 A1 12/2016 Shemer et al.
2017/0289679 A1 10/2017 Amarilio et al.
2018/0048744 A1 2/2018 Bhat Noojady Krishna et al.

\* cited by examiner

SYSTEMS AND METHODS FOR POWER CONSERVATION IN A SOUNDWIRE AUDIO BUS THROUGH PATTERN RECOGNITION

BACKGROUND

I. Field of the Disclosure

The technology of the disclosure relates generally to audio buses and, more particularly, to controlling power consumption on SOUNDWIRE audio buses.

II. Background

Mobile communication devices have become increasingly common in current society. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

The mobile communication devices commonly include at least one microphone and multiple speakers. The microphone and the speakers used in the mobile communication devices typically have analog interfaces which require a dedicated two-wire connection between each pair of devices. Since a mobile communication device is capable of supporting multiple audio devices, it may be desired to allow a microprocessor or other control device in the mobile communication device to communicate audio data to multiple audio devices over a common communication bus simultaneously.

In this regard, the MIPI® Alliance initially developed the Serial Low-power Inter-chip Media Bus (SLIMbus$^{SM}$ or SLIMBUS) to handle audio signals within a mobile communication device. The first release was published in October 2005 with v1.01 released on Dec. 3, 2008. In response to industry feedback, MIPI has also developed SoundWire$^{SM}$ (SOUNDWIRE), a communication protocol for a processor in the mobile communication device (the "master") to control distribution of digital audio streams between one or more audio devices (the "slave(s)") via one or more SOUNDWIRE slave data ports. Version 1 was released Jan. 21, 2015.

Both SLIMBUS and SOUNDWIRE rely on non-return to zero inverted (NRZI) encoding at the transport layer to place data on the bus. NRZI is a two-level signal, where the presence or absence of a transition of the signal at a clock boundary is used to signal a one (1) or a zero (0). That is, if a one is being transmitted, the data line transitions at the clock signal and if a zero is being transmitted, the data line maintains the signal without a transition. It should be appreciated that each transition consumes more power than the absence of a transition. Given that statistically approximately 50% of a signal will be formed from ones, a large number of ones are present in a given audio stream with corresponding power consumption.

SUMMARY OF THE DISCLOSURE

Aspects disclosed in the detailed description include systems and methods for power conservation in a SOUNDWIRE audio bus. In an exemplary aspect, a pulse density modulated (PDM) audio stream at an audio source is provided to an encoder. The encoder has a plurality of encoding states corresponding to bit patterns. The encoder compares bits of the audio stream to available bit patterns and selects an encoding state. The audio source sends the encoding state to an audio sink and then sends data to the audio sink based on encoding using the selected encoding state. The data is sent over a non-return to zero inverted (NRZI) audio bus. As the audio stream changes bit patterns, the encoder may select different more efficient encoding states and provide updates to the audio sink of changes in the encoding state. The net result of using encoding states based on bit patterns is a reduction in a number of ones sent over the NRZI audio bus, which in turn provides power savings relative to systems that do not use this pattern-based encoding.

In this regard in one aspect, a method for handling data on an audio bus is disclosed. The method includes placing a state machine at an audio source in a first pattern encoding state. The method also includes, while bits in and audio stream at the audio source match a first pattern corresponding to the first pattern encoding state, sending zeroes over an NRZI audio bus to an audio sink. The method also includes determining that the audio stream has changed to match a second pattern. The method also includes placing the state machine in a second pattern encoding state. The method also includes, responsive to determining that the audio stream has changed to match the second pattern, sending a second pattern identifier to the audio sink. The method also includes, after sending the second pattern identifier, while the bits in the audio stream match the second pattern, sending zeroes over the NRZI audio bus to the audio sink.

In another aspect, a method for handling data on an audio bus is disclosed. The method includes setting a bit pattern decoding state machine at an audio sink to a first pattern. The method also includes, while receiving zeroes from an NRZI audio bus, decoding the zeroes as repeated instances of the first pattern. The method also includes receiving a pattern change indication from an audio source. The method also includes changing the bit pattern decoding state machine to a second pattern responsive to receiving the pattern change indication.

In another aspect, an audio source is disclosed. The audio source includes a bus interface configured to be coupled to an NRZI audio bus. The audio source also includes a PDM port configured to receive a PDM-encoded audio stream. The audio source also includes a bit pattern encoding state machine coupled to the PDM port and the bus interface. The bit pattern encoding state machine is configured to, while bits in the PDM-encoded audio stream match a first pattern corresponding to a first pattern encoding state, sending zeroes to the bus interface to be sent over the NRZI audio bus. The bit pattern encoding state machine is also configured to determine that the PDM-encoded audio stream has changed to match a second pattern. The bit pattern encoding state machine is also configured to enter a second pattern encoding state. The bit pattern encoding state machine is also configured to send a second pattern identifier over the NRZI audio bus.

In another aspect, an audio sink is disclosed. The audio sink includes a bus interface configured to be coupled to an NRZI audio bus. The audio sink also includes a PDM output port. The audio sink also includes a bit pattern decoding state machine coupled to the bus interface and the PDM output port. The bit pattern decoding state machine is configured to set a first state corresponding to a first pattern. The bit pattern decoding state machine is also configured to, while receiving zeroes from the NRZI audio bus through the bus interface, decode the zeroes as repeated instances of the first pattern. The bit pattern decoding state machine is also configured to receive a pattern change indication from an audio source. The bit pattern decoding state machine is also configured to change to a second state responsive to receiving the pattern change indication.

DETAILED DESCRIPTION

Figure 1:
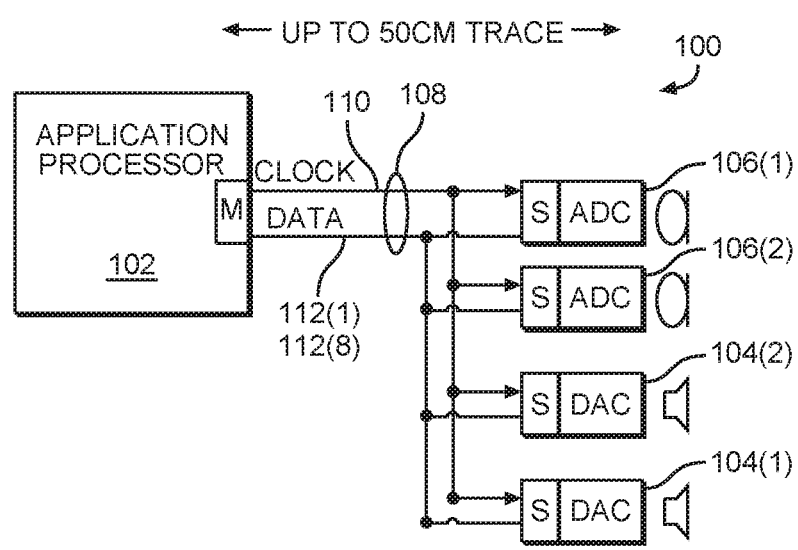
FIG. 1 is a simplified block diagram of an exemplary audio system using a SOUNDWIRE audio bus to transport audio data that incorporates exemplary power conservation techniques.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for power conservation in a SOUNDWIRE audio bus. In an exemplary aspect, a pulse density modulated (PDM) audio stream at an audio source is provided to an encoder. The encoder has a plurality of encoding states corresponding to bit patterns. The encoder compares bits of the audio stream to available bit patterns and selects an encoding state. The audio source sends the encoding state to an audio sink and then sends data to the audio sink based on encoding using the selected encoding state. The data is sent over a non-return to zero inverted (NRZI) audio bus. As the audio stream changes bit patterns, the encoder may select different more efficient encoding states and provide updates to the audio sink of changes in the encoding state. The net result of using encoding states based on bit patterns is a reduction in a number of ones sent over the NRZI audio bus, which in turn provides power savings relative to systems that do not use this pattern-based encoding.

Figure 2:
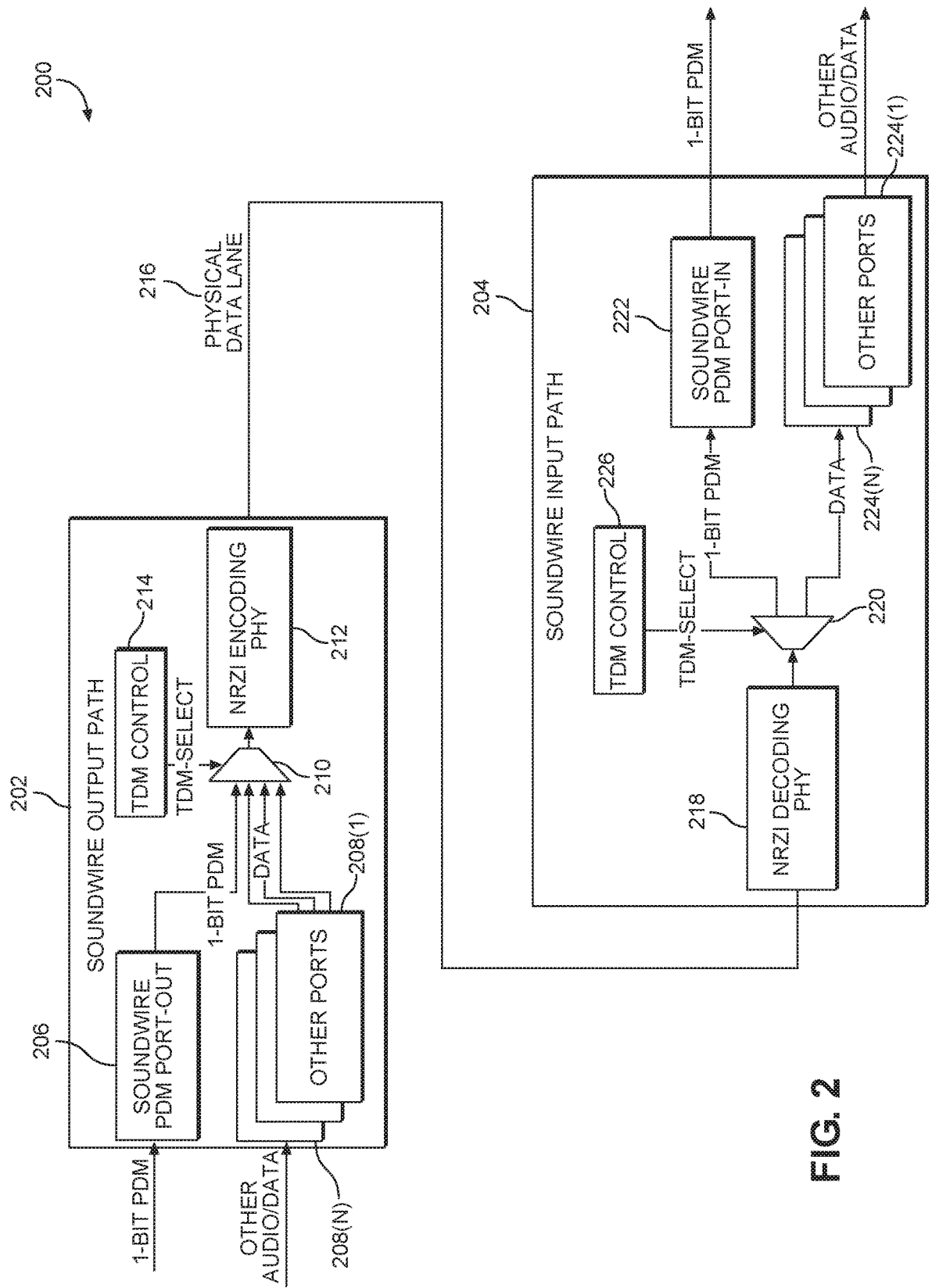
FIG. 2 is a simplified block diagram of a conventional audio source coupled to a conventional audio sink over a SOUNDWIRE audio bus.

Before addressing exemplary power saving processes for NRZI audio buses carrying PDM-encoded audio samples, a brief overview of a SOUNDWIRE audio system is provided with reference to FIG. 1 with a more detailed view of a conventional audio source coupled to an audio sink provided with reference to FIG. 2. A discussion of an audio source having a bit pattern encoder according to exemplary aspects of the present disclosure coupled to an audio sink having a bit pattern decoder with associated processes that can reduce transitions on an NRZI bus and save power begins below with reference to FIG. 3.

In this regard, FIG. 1 is block diagram of an exemplary SOUNDWIRE audio system 100. The SOUNDWIRE audio system 100 includes an application processor 102 coupled to a plurality of microphones 104(1)-104(2) and a plurality of speakers 106(1)-106(2) by a multi-wire bus 108. The multi-wire bus 108 includes a clock line 110 and one or more (up to eight) data lines 112(1)-112(8). The application processor 102 is generally regarded as a master of the SOUNDWIRE audio system 100, and the plurality of microphones 104(1)-104(2) and the plurality of speakers 106(1)-106(2) (as well as any other audio components) are slaves. It should further be appreciated that the microphones 104(1)-104(2) are examples of audio sources (i.e., components that place audio data onto the multi-wire bus 108), and the speakers 106(1)-106(2) are examples of audio sinks (i.e., components that receive audio data from the multi-wire bus 108). The application processor 102 may be an audio source or an audio sink as is well understood. While illustrated as the application processor 102, it should be appreciated that the application processor 102 could be replaced by a codec (not illustrated).

While many audio elements rely on pulse code modulation (PCM) to encode audio streams, there are a number of elements, particularly certain microphones, that use PDM encoding. As with PCM, PDM statistically has about an average of 50% logical ones in an audio stream. An overview of a simple conventional PDM-based audio source-audio sink in a SOUNDWIRE audio system 200 is provided with reference to FIG. 2. The SOUNDWIRE audio system 200 includes an audio source 202, which may be a codec, a microphone, or the like. Similarly, the SOUNDWIRE audio system 200 includes an audio sink 204, which may be a speaker, a codec, or the like. The audio source 202 includes a PDM port 206 as well as other ports 208(1)-208(N) which provide data streams that are multiplexed by a multiplexer 210 to an NRZI encoding physical layer (PHY) 212. A control system 214 controls which data stream is provided to the NRZI encoding PHY 212. The NRZI encoding PHY 212 places the now NRZI-encoded data on a physical data lane 216 of a SOUNDWIRE bus.

With continued reference to FIG. 2, the audio sink 204 includes an NRZI decoding PHY 218 that receives the data from the physical data lane 216 and decodes the NRZI-encoded data. The NRZI decoding PHY 218 passes the decoded data to a demultiplexer 220 that separates the data to a SOUNDWIRE PDM port 222 and other ports 224(1)-224(N). A control system 226 controls the demultiplexer 220 as is well understood.

Exemplary aspects of the present disclosure add a bit pattern encoding state machine to an audio source and a complementary bit pattern decoding state machine to an audio sink to reduce the number of ones (i.e., transitions) on an NRZI bus. By reducing the number of ones on the NRZI bus, power is saved.

Figure 3:
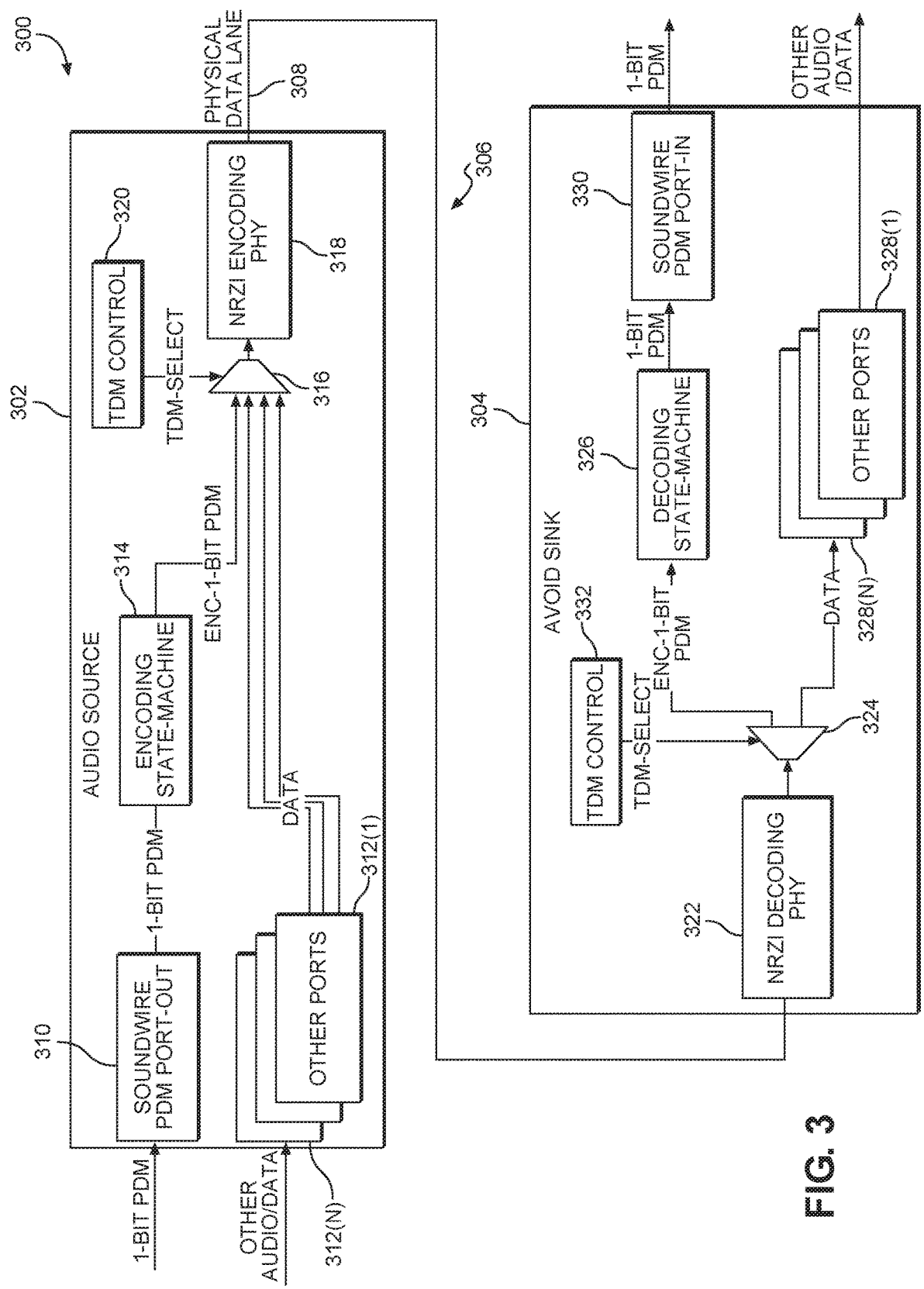
FIG. 3 is a simplified block diagram of an audio source using a bit pattern encoder according to exemplary aspects of the present disclosure, the audio source coupled over a SOUNDWIRE audio bus to an audio sink with a corresponding bit pattern decoder.

In this regard, FIG. 3 illustrates an audio system 300, which may be a SOUNDWIRE audio system, that includes an audio source 302, which may be a codec, microphone, or the like, and an audio sink 304, which may be a speaker, codec, or the like, coupled by a SOUNDWIRE audio bus 306 having a physical data lane 308. The audio source 302 includes a PDM port 310, as well as other ports 312(1)-312(N). The audio source 302 further includes a bit pattern encoding state machine 314 that operates on the data received at the PDM port 310 and encodes the PDM bit stream as explained in greater detail below. The bit pattern encoded bit stream and other bit streams from the other ports 312(1)-312(N) are multiplexed by a multiplexer 316 to be provided to an NRZI encoding PHY 318. The NRZI encoding PHY 318 is also referred to as a bus interface configured to be coupled to the SOUNDWIRE audio bus 306. The multiplexer 316 is controlled by a control system 320.

With continued reference to FIG. 3, the audio sink 304 includes an NRZI decoding PHY 322 that receives the data from the physical data lane 308 and decodes the NRZI encoded data. The NRZI decoding PHY 322 is also referred to as a bus interface configured to be coupled to the SOUNDWIRE audio bus 306. The NRZI decoding PHY 322 passes the decoded data to a demultiplexer 324 that separates the data to a bit pattern decoding state machine 326 and other ports 328(1)-328(N). The bit pattern decoding state machine 326 passes the decoded data to a PDM port 330. A control system 332 controls the demultiplexer 324 as is well understood.

Exemplary aspects of the present disclosure take advantage of the nature of PDM encoded bit streams. Specifically, there will be patterns that repeat in a PDM stream. For example, a silent tone is a string of repeated ones and zeros (e.g., 0101010101). Rather than send each of those ones, which represents a transition in an NRZI bus, exemplary aspects of the present disclosure cause the audio source to send an indication of the identified pattern to the audio sink, then so long as that pattern is occurring, the audio source sends zeroes. When a new pattern is noted in the incoming audio stream, the audio source tells the audio sink that there is a new pattern and resumes sending zeroes. As a zero does not cause a transition on an NRZI bus, the net effect is to reduce the number of ones sent on the NRZI bus, and thus reduce the number of transitions. The reduction in transitions represents a power savings relative to the conventional approach. In this regard, FIGS. 4 and 5 provide flowcharts of the process from an audio source and audio sink point of view, respectively.

Figure 4:
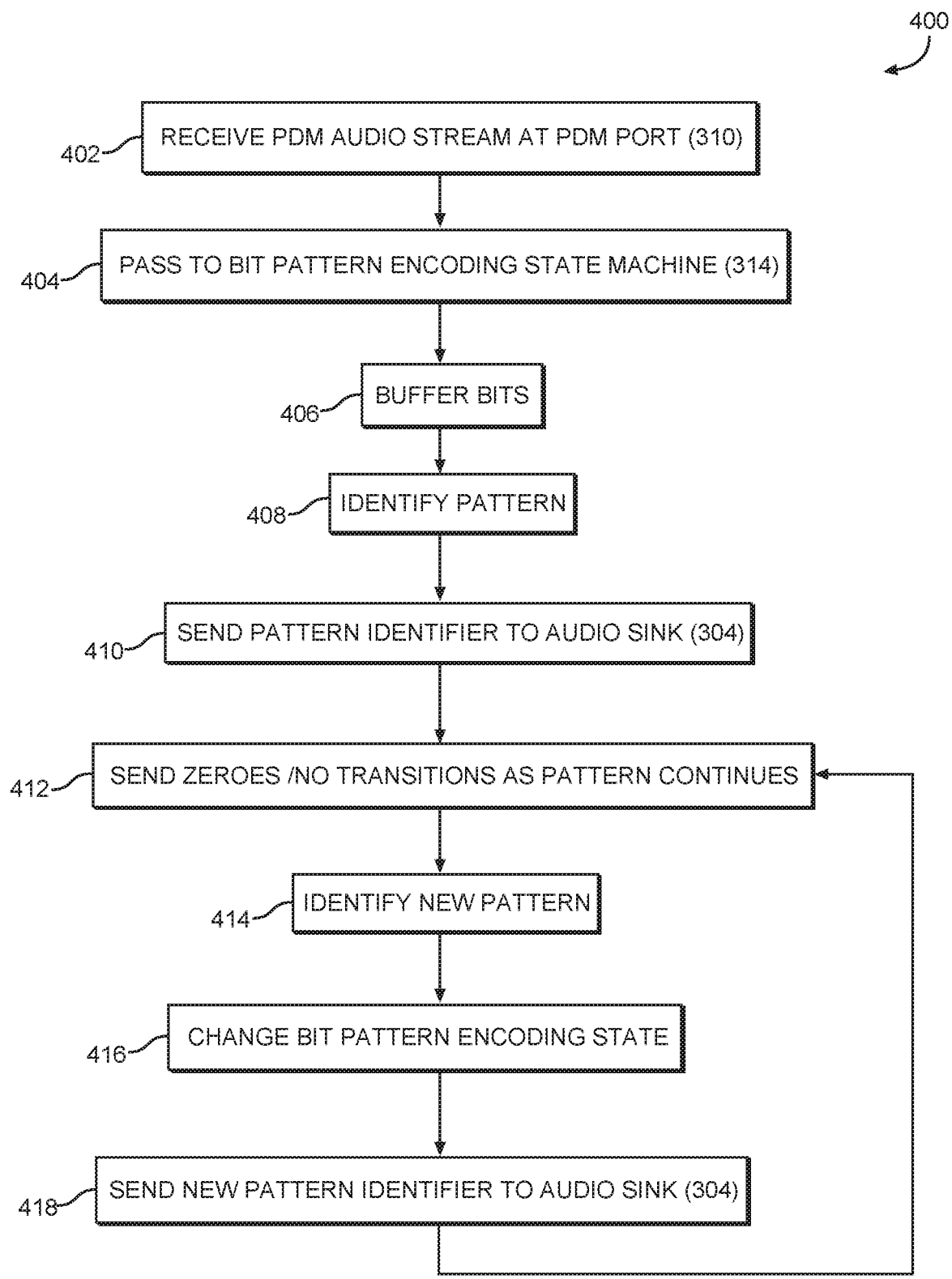
FIG. 4 is a flowchart illustrating an exemplary process for reducing power consumption by consolidation of transitions based on bit patterns according to an exemplary aspect of the present disclosure.
Figure 5:
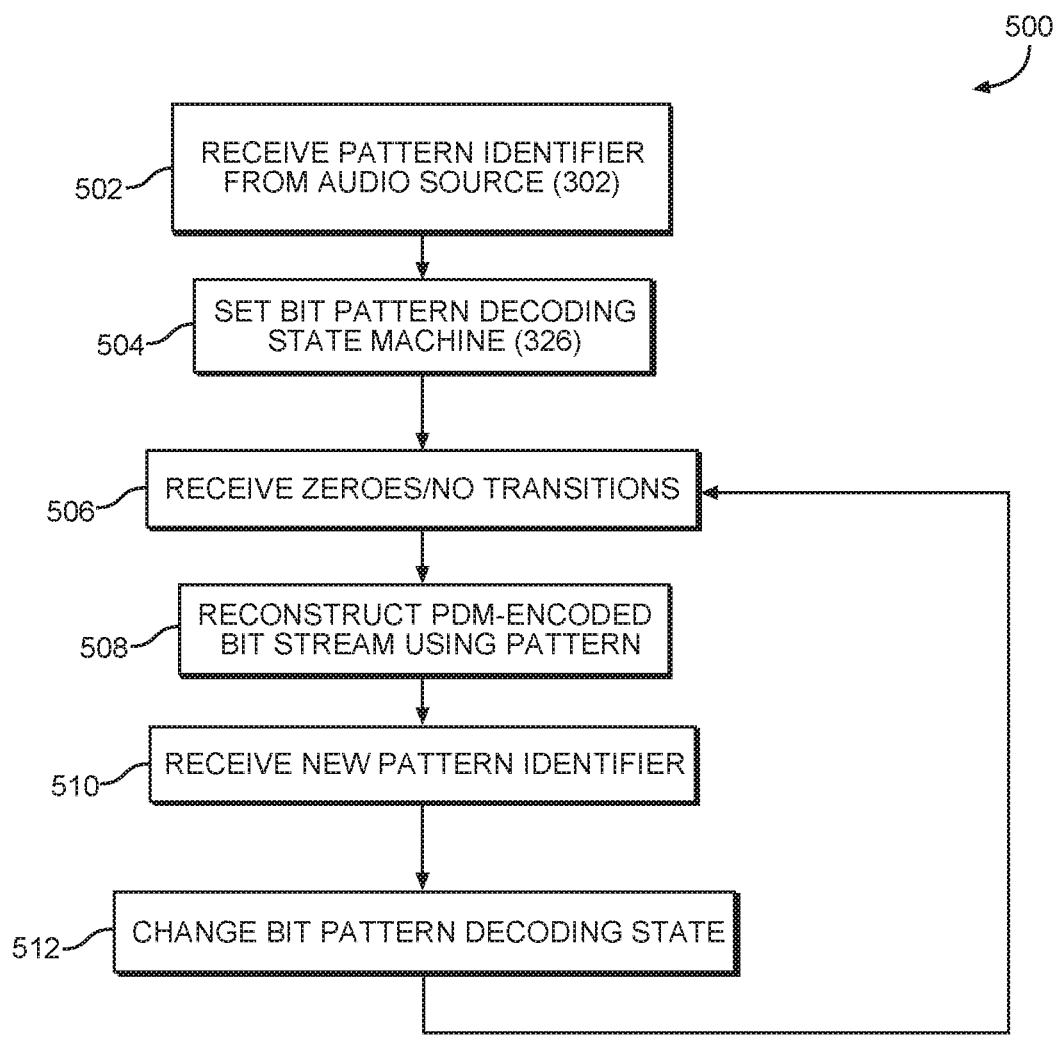
FIG. 5 is a flowchart illustrating an exemplary process for decoding bit patterns at an audio sink.

In this regard, FIG. 4 illustrates process 400 that begins with the audio source 302 receiving a PDM audio stream at the PDM port 310 (block 402). The PDM audio stream may be divided into channels to support a sink device, for example, left and right channels for headphones. Such channels may be present at the PDM port 310. The encoding (and decoding) of the present disclosure is done on a per-channel per-port basis. Note that the audio source 302 may determine that the audio stream is a PDM-encoded audio stream (as opposed to, for example, a pulse code modulated (PCM) audio stream). The bits of the PDM audio stream are passed to a bit pattern encoding state machine 314 (block 404). The bits of the PDM audio stream may be buffered (block 406). This buffering may be inside the bit pattern encoding state machine 314 or in a register accessible by the bit pattern encoding state machine 314. The bit pattern encoding state machine 314 then identifies a pattern in the bits of the PDM audio stream (block 408). That is, the bit pattern encoding state machine 314 detects that a pattern exists and what that pattern is. At its simplest, the pattern may be repeated ones (11), repeated zeroes (00), or alternating ones and zeroes (10 or 01). While simple two-bit patterns are readily accommodated by the present disclosure, the present disclosure is not so limited and can accommodate three, four, or more bit patterns if needed or desired. However, for the sake of example, a two-bit pattern will be used.

Further note that the audio source 302 and the audio sink 304 may start in a default encoding state known to both a priori. That is, both the audio source 302 and the audio sink 304 may know what the first encoding pattern will be before any encoded bits are sent or received. For example, alternating ones and zeroes are common, so the default starting state may be 10 or 01.

With continued reference to FIG. 4, the bit pattern encoding state machine 314 sends a pattern identifier to the audio sink 304 (block 410) through the NRZI encoding PHY 318 and the SOUNDWIRE audio bus 306. Note that the pattern identifier may be a series of predefined bits, such as a one to signify a new pattern, followed by the predesignated code which identifies the pattern. Further, the pattern identifier may also be used to tell the audio sink 304 that normal PDM bits are being sent. Collectively the signifier for the new pattern and the code for the new pattern may be referred to as pattern change identifier or pattern change indication. Note that these terms may also refer to merely the signifier of the new pattern. The audio source 302 sends only zeroes (i.e., no transitions) while the pattern continues (repeats) (block 412). At some point, the PDM audio stream may change, and the bit pattern encoding state machine 314 will identify a new pattern (block 414). The bit pattern encoding state machine 314 changes the bit pattern encoding state to reflect the new pattern (i.e., a second bit pattern encoding state) (block 416) and sends a new pattern identifier to the audio sink 304 (block 418). As noted above, the new pattern identifier may be preceded by a one to signify to the audio sink 304 that a new pattern is being provided. The following bits may define the pattern. The process 400 loops back to block 412 by sending zeros so long as the pattern continues.

At the audio sink 304, the original PDM-encoded audio stream is recovered and made available for further processing (e.g., if sent to a codec audio sink) or playback (e.g., if sent to a speaker audio sink). In this regard, FIG. 5 illustrates process 500 for such recovery. The process 500 starts with the audio sink 304 receiving a pattern identifier from the audio source 302 (block 502) over the SOUNDWIRE audio bus 306. Based on the received pattern identifier, the bit pattern decoding state machine 326 is set (block 504). The audio sink 304 receives one or more zeros (i.e., no transitions) indicating that the pattern is repeating (block 506). The bit pattern decoding state machine 326 then reconstructs the PDM-encoded bit stream using the pattern in place of the received zeros (block 508). At some point, the original bit stream may change patterns, and the audio sink 304 receives a new pattern identifier (block 510). The bit pattern decoding state machine 326 updates the bit pattern decoding state (block 512), and the process 500 loops back to block 506.

Note that there may be instances where a pattern is not repeated. In such instances, the signaling of the present disclosure may, in the short term, have more transitions than just sending the raw bits of the audio stream. However, analysis of a variety of audio streams shows that on average, a savings of 60-85% (depending on the type of audio stream (e.g., music is around 65%, phone calls around 75% and gaming around 85%)) may be achieved through using aspects of the present disclosure.

Figure 6:
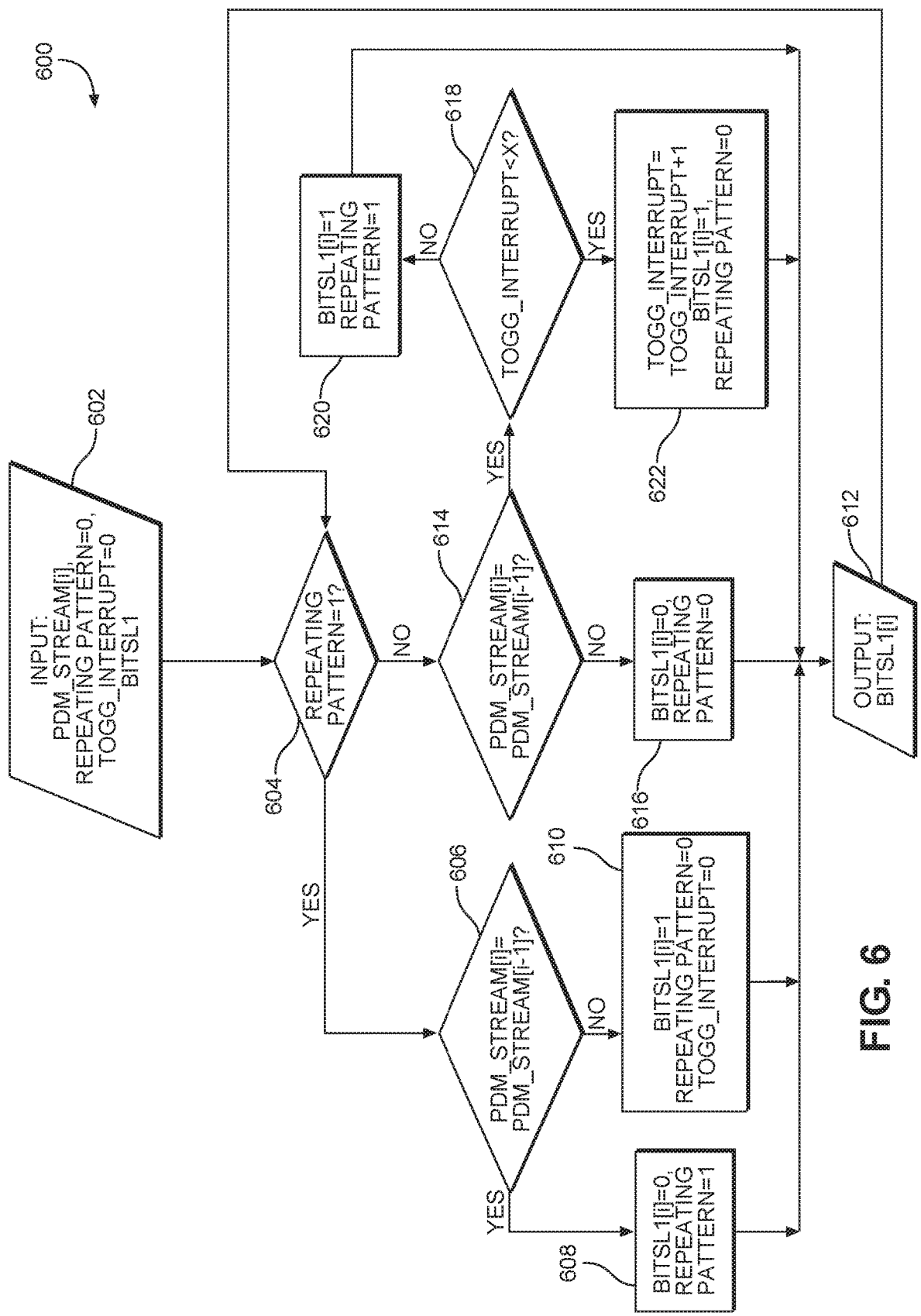
FIG. 6 is a flowchart of a specific pattern recognition and transmission process for the audio sink.

While the generic processes 400 and 500 of FIGS. 4 and 5 are contemplated, for the sake of illustration, FIGS. 6-9 provide a more specific example. FIG. 6 is a flowchart with pseudocode 600 showing the process 400 of FIG. 4 assuming a two-bit pattern. In particular, the pseudocode 600 starts with an input stream PDM_stream[i] with repeating pattern=0 and Togg_interrupt=0 (block 602). The bit pattern encoding state machine 314 tests to see if the repeating pattern=1 (block 604). If the repeating pattern=1, the bit pattern encoding state machine 314 checks if the PDM_stream=PDM_stream [i−1] (block 606). If they are equal, then BITSL=0, and the repeating pattern=1 (block 608). If, however, they are not equal, then BITSL1[i]=1, repeating pattern=0, and Togg_interrupt=0 (block 610). In either event, the bit pattern encoding state machine 314 outputs BITSL1[i] (block 612) and loops back to block 604.

With continued reference to FIG. 6, if the answer to block 604 is no, then the bit pattern encoding state machine 314 checks if PDM_stream[i]=PDM_stream[i−1] (block 614). If the answer to block 614 is no, then the bit pattern encoding state machine 314 sets BITSL=0, repeating pattern=0 (block 616), and outputs BITSL1[i] (block 612) while looping back to block 604. If the answer to block 614 is yes, the bit pattern encoding state machine 314 checks if Togg_interrupt<X (where X is some predefined constant) (block 618). If the answer is no, then the bit pattern encoding state machine 314 sets BITSL1[i]=1, repeating pattern=1 (block 620), and outputs BITS1[i] (block 612) while looping back to block 604. If, however, the answer to block 618 is yes, then the bit pattern encoding state machine 314 sets Togg_interrupt=Togg_interrupt+1, BITSL1[i]=1, repeating pattern=0 (block 622), and outputs BITSL1[i] (block 612) while looping back to block 604.

Figure 7:
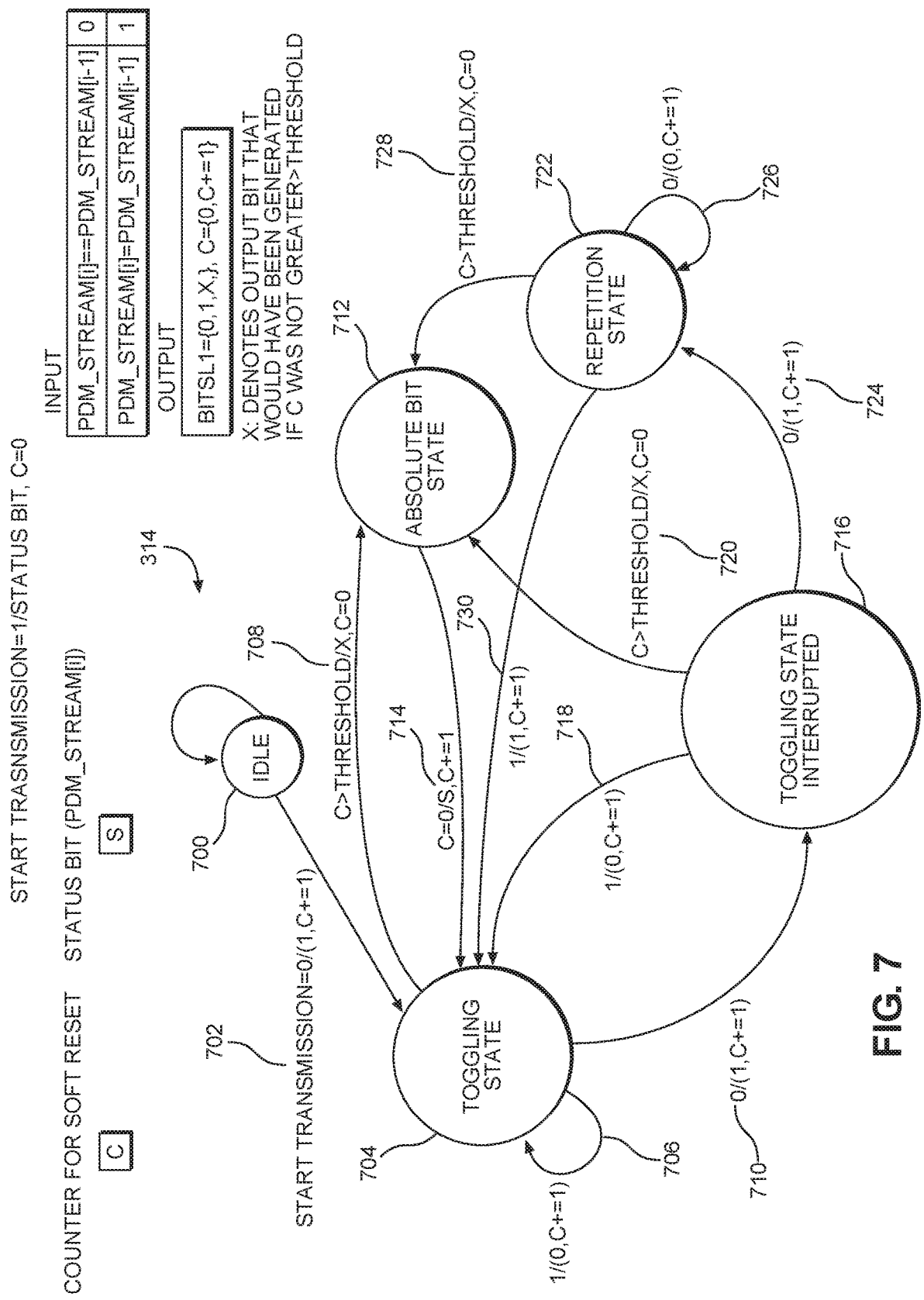
FIG. 7 is a state machine diagram for bit pattern states for an encoder at an audio source.
Figure 8:
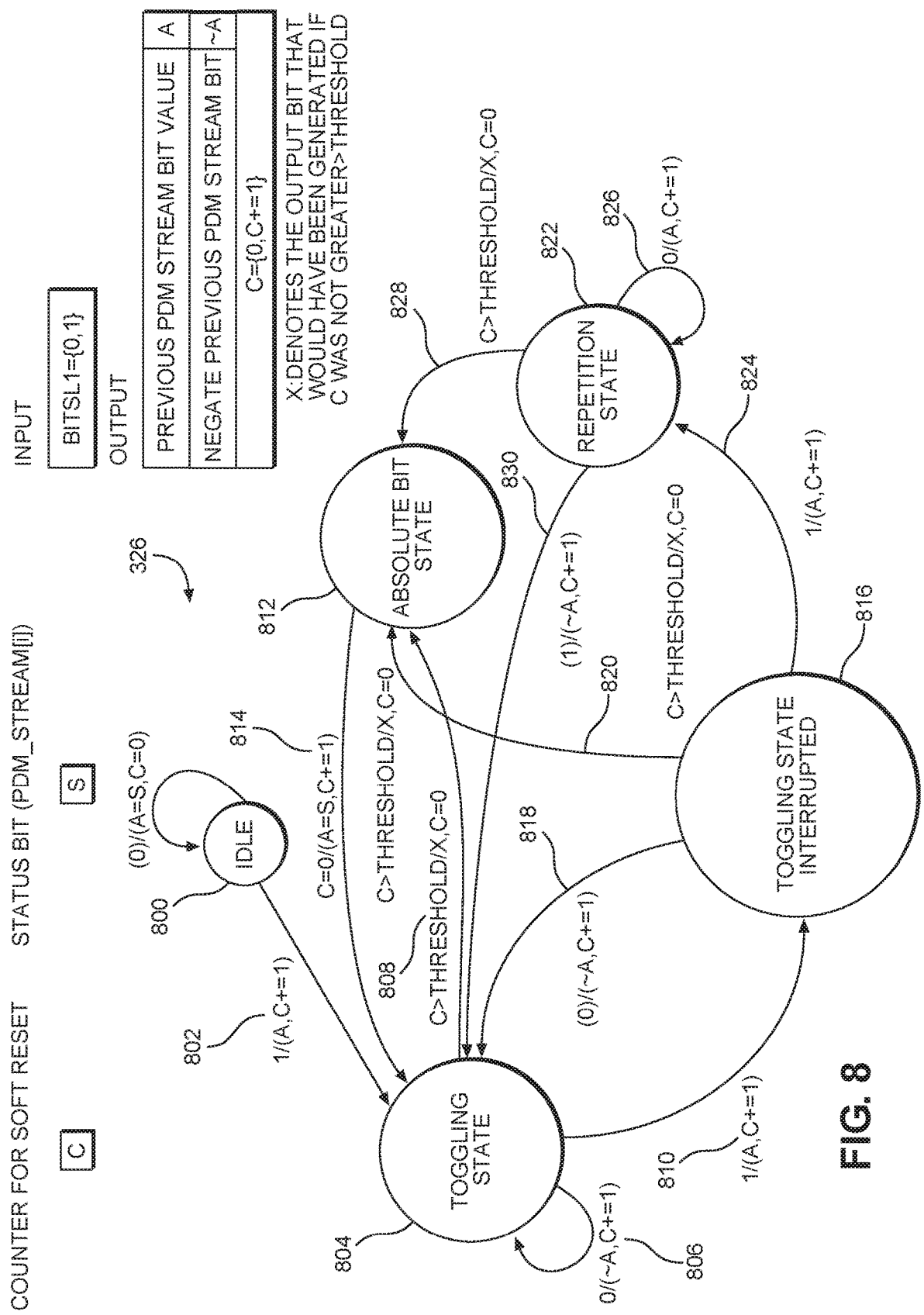
FIG. 8 is a state machine diagram for bit pattern states for a decoder at an audio sink.

FIGS. 7 and 8 are state diagrams for the bit pattern encoding state machine 314 and the bit pattern decoding state machine 326, respectively, and use the variables introduced in FIG. 6 to show how the bit pattern state machines 314 and 326 move between idle states, toggling states, absolute bit states, repetition states, and toggling states interrupted.

In particular, FIG. 7 illustrates the states of the bit pattern encoding state machine 314. The bit pattern encoding state machine 314 starts in an idle state 700 and loops in the idle state 700 until a transmission start (transition 702), when the counter (C) for a soft reset is incremented and the bit pattern encoding state machine 314 enters a toggling state 704. The bit pattern encoding state machine 314 remains in the toggling state 704 (loop 706), incrementing the counter (C) until either C>threshold (transition 708) or the toggling state is interrupted (transition 710). If the threshold is exceeded, then the bit pattern encoding state machine 314 enters an absolute bit state 712, which represents a new restart for restarting the transmission, after which the bit pattern encoding state machine 314 returns to the toggling state 704 with a fresh counter C (transition 714). Note that the bus may have bit errors. The solution to these bit errors is to reset the bit pattern encoding state machine 314 and resynchronize through the absolute bit state 712. In the absolute bit state 712, an actual raw bit value is sent. Note that the threshold may be a result of a hardware watchdog timer or may be software-defined.

If the toggling state 704 is interrupted, the bit pattern encoding state machine 314 goes to an interrupted state 716, from which the bit pattern encoding state machine 314 may return to the toggling state 704 if the original toggling resumes (transition 718), may enter the absolute bit state 712 if the threshold is exceeded (transition 720), or may enter a repetition state 722 (transition 724) if the bits repeat instead of toggle. The bit pattern encoding state machine 314 stays in the repetition state 722 so long as the repetition repeats (loop 726) and the threshold has not been exceeded. If the threshold is exceeded, then the bit pattern encoding state machine 314 enters the absolute bit state 712 (transition 728). Alternatively, the bit pattern encoding state machine 314 may return to the toggling state 704 if the repetition ends (transition 730).

Similarly, FIG. 8 illustrates the states of the bit pattern decoding state machine 326. The bit pattern decoding state machine 326 starts in an idle state 800 and loops in the idle state 800 until a reception start (transition 802), when the counter (C) for a soft reset is incremented and the bit pattern decoding state machine 326 enters a toggling state 804. The bit pattern decoding state machine 326 remains in the toggling state 804 (loop 806), incrementing the counter (C) until either C>threshold (transition 808) or the toggling state 804 is interrupted (transition 810). If the threshold is exceeded, then the bit pattern decoding state machine 326 enters an absolute bit state 812, which represents a new restart for restarting the reception, after which the bit pattern decoding state machine 326 returns to the toggling state 804 with a fresh counter C (transition 814). Note that the bus may have bit errors. The solution to these bit errors is to reset the bit pattern decoding state machine 326 and resynchronize through the absolute bit state 812. In the absolute bit state 812, an actual raw bit value is received. Note that the threshold may be a result of a hardware watchdog timer or may be software-defined.

If the toggling state 804 is interrupted, the bit pattern decoding state machine 326 goes to an interrupted state 816, from which the bit pattern decoding state machine 326 may return to the toggling state 804 if the original toggling resumes (transition 818), may enter the absolute bit state 812 if the threshold is exceeded (transition 820), or may enter a repetition state 822 (transition 824) if the bits repeat instead of toggle. The bit pattern decoding state machine 326 stays in the repetition state 822 so long as the repetition repeats (loop 826) and the threshold has not been exceeded. If the threshold is exceeded, then the bit pattern decoding state machine 326 enters the absolute bit state 812 (transition 828). Alternatively, the bit pattern decoding state machine 326 may return to the toggling state 804 if the repetition ends (transition 830).

Figure 9:
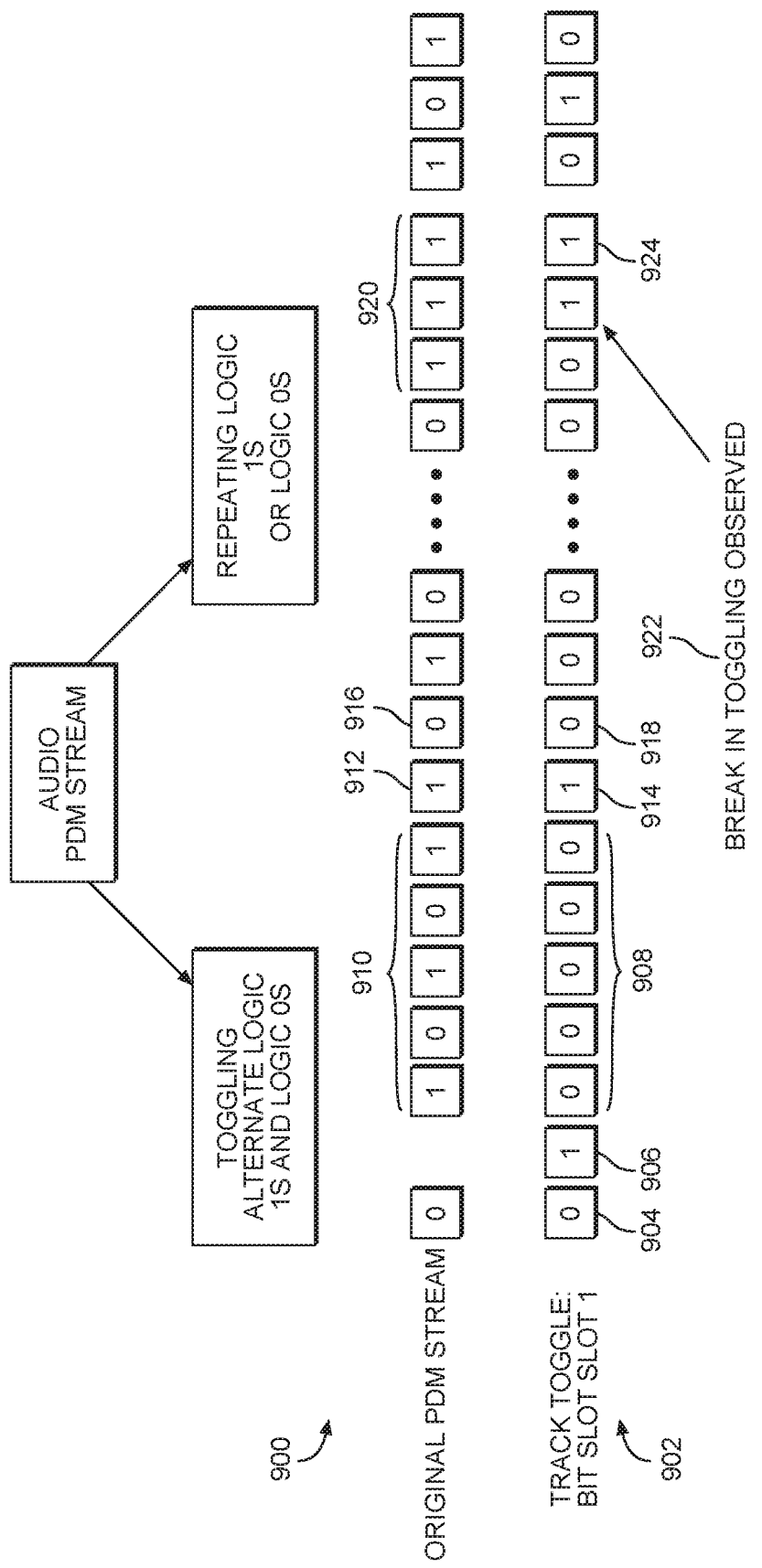
FIG. 9 is a pulse density modulated (PDM) audio stream without encoding compared to an audio stream encoded according to the processes of FIGS. 4 and 5.

FIG. 9 illustrates a PDM-encoded audio stream 900 and an associated encoded audio stream 902 after the process 400 of FIG. 4 has been applied. In particular, the encoded audio stream 902 starts with a status bit 904 that notes the initial state of the bus. This status bit 904 is followed by a start bit 906, which is a one to transition the line and alert the audio sink that the line is active. The initial pattern is 10, which may be a default bit pattern for the bit pattern encoding state machine 314, so zeroes 908 are sent while the pattern holds (generally 910). When the pattern breaks at 912, a transition 914 is sent, but because a new pattern does not start at 916, a zero is sent at 918, followed by more zeroes as the default pattern has resumed until 920 when a new repetition of ones causes a transition to be sent at 922, and a new pattern indicated at 924.

The systems and methods for power conservation in a SOUNDWIRE audio bus according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 10:
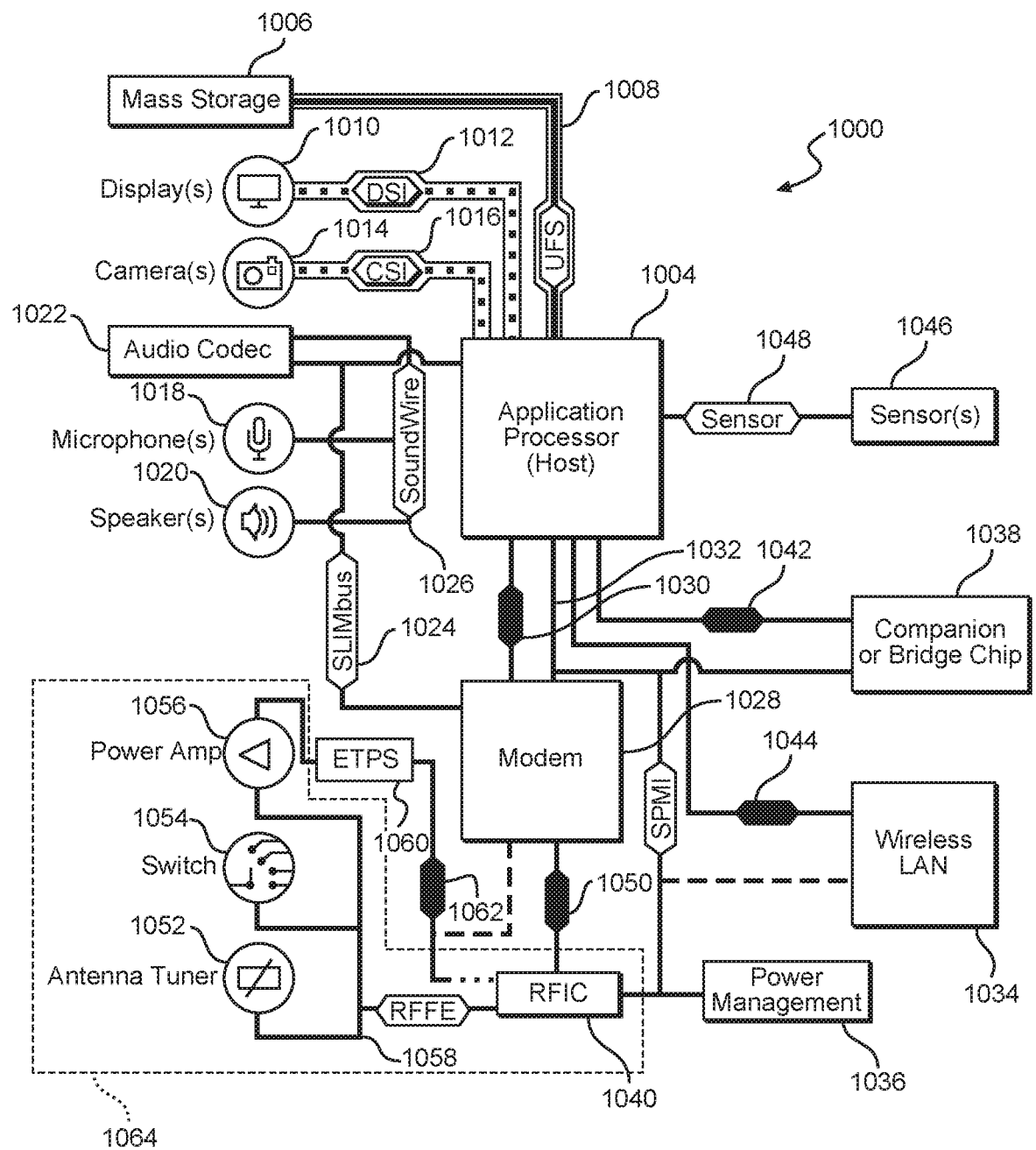
FIG. 10 is a block diagram of an exemplary processor-based system that can include the SOUNDWIRE audio system of FIG. 1 that performs the processes of FIGS. 4 and 5.

In this regard, FIG. 10 is a system-level block diagram of an exemplary mobile terminal 1000 such as a smart phone, mobile computing device tablet, or the like. While a mobile terminal having a SOUNDWIRE bus is particularly contemplated as being capable of benefiting from exemplary aspects of the present disclosure, it should be appreciated that the present disclosure is not so limited and may be useful in any system having a time division multiplexed (TDM) bus.

With continued reference to FIG. 10, the mobile terminal 1000 includes an application processor 1004 (sometimes referred to as a host) that communicates with a mass storage element 1006 through a universal flash storage (UFS) bus 1008. The application processor 1004 may further be connected to a display 1010 through a display serial interface (DSI) bus 1012 and a camera 1014 through a camera serial interface (CSI) bus 1016. Various audio elements such as a microphone 1018, a speaker 1020, and an audio codec 1022 may be coupled to the application processor 1004 through a serial low-power interchip multimedia bus (SLIMBUS) 1024. Additionally, the audio elements may communicate with each other through a SOUNDWIRE bus 1026. A modem 1028 may also be coupled to the SLIMBUS 1024 and/or the SOUNDWIRE bus 1026. The modem 1028 may further be connected to the application processor 1004 through a peripheral component interconnect (PCI) or PCI express (PCIe) bus 1030 and/or a system power management interface (SPMI) bus 1032.

With continued reference to FIG. 10, the SPMI bus 1032 may also be coupled to a wireless local area network (LAN or WLAN) IC (LAN IC or WLAN IC) 1034, a power management integrated circuit (PMIC) 1036, a companion IC (sometimes referred to as a bridge chip) 1038, and a radio frequency IC (RFIC) 1040. It should be appreciated that separate PCI buses 1042 and 1044 may also couple the application processor 1004 to the companion IC 1038 and the WLAN IC 1034. The application processor 1004 may further be connected to sensors 1046 through a sensor bus 1048. The modem 1028 and the RFIC 1040 may communicate using a bus 1050.

With continued reference to FIG. 10, the RFIC 1040 may couple to one or more RFFE elements, such as an antenna tuner 1052, a switch 1054, and a power amplifier 1056 through a radio frequency front end (RFFE) bus 1058. Additionally, the RFIC 1040 may couple to an envelope tracking power supply (ETPS) 1060 through a bus 1062, and the ETPS 1060 may communicate with the power amplifier 1056. Collectively, the RFFE elements, including the RFIC 1040, may be considered an RFFE system 1064. It should be appreciated that the RFFE bus 1058 may be formed from a clock line and a data line (not illustrated).

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A method for handling data on an audio bus, comprising:
   placing a state machine at an audio source in a first pattern encoding state;
   while bits in an audio stream at the audio source match a first pattern corresponding to the first pattern encoding state, sending zeroes over a non-return to zero-inverted (NRZI) audio bus to an audio sink;
   determining that the audio stream has changed to match a second pattern;
   placing the state machine in a second pattern encoding state;
   responsive to determining that the audio stream has changed to match the second pattern, sending a second pattern identifier to the audio sink;
   after sending the second pattern identifier, while the bits in the audio stream match the second pattern, sending zeros over the NRZI audio bus to the audio sink;
   detecting that the bits in the audio stream follow the first pattern after a one-bit discontinuity; and
   sending a one to the audio sink at the one-bit discontinuity and resuming sending zeroes while the bits in the audio stream resume following the first pattern.

2. The method of claim 1, further comprising determining that an audio sample is a pulse density modulated (PDM) audio sample.

3. The method of claim 1, wherein sending comprises sending over a SOUNDWIRE audio bus.

4. The method of claim 1, wherein sending the second pattern identifier comprises sending an initial one to the audio sink to indicate that the first pattern has discontinued.

5. The method of claim 1, wherein the first pattern encoding state comprises a default encoding state known by the audio sink before receiving encoded data.

6. A method for handling data on an audio bus, comprising:
   setting a bit pattern decoding state machine at an audio sink to a first pattern;
   while receiving zeroes from a non-return to zero-inverted (NRZI) audio bus, decoding the zeroes as repeated instances of the first pattern;
   receiving a pattern change indication from an audio source;
   changing the bit pattern decoding state machine to a second pattern responsive to receiving the pattern change indication; and
   detecting a single one on the NRZI audio bus followed by plural zeroes and treating the single one as a discontinuity in the second pattern and resuming decoding using the first pattern.

7. The method of claim 6, wherein the NRZI audio bus comprises a SOUNDWIRE audio bus.

8. The method of claim 6, further comprising decoding a plurality of zeroes based on the second pattern after changing the bit pattern decoding state machine to the second pattern.

9. The method of claim 6, further comprising starting the bit pattern decoding state machine with a default pattern.

10. The method of claim 6, further comprising playing an audio stream based on data received from the NRZI audio bus through a speaker.

11. An audio source comprising:
    a bus interface configured to be coupled to a non-return to zero-inverted (NRZI) audio bus;
    a pulse density modulated (PDM) port configured to receive a PDM-encoded audio stream; and
    a bit pattern encoding state machine coupled to the PDM port and the bus interface, the bit pattern encoding state machine configured to:
      while bits in the PDM-encoded audio stream match a first pattern corresponding to a first pattern encoding state, sending zeroes to the bus interface to be sent over the NRZI audio bus;
      determine that the PDM-encoded audio stream has changed to match a second pattern;
      enter a second pattern encoding state;
      send a second pattern identifier over the NRZI audio bus;
      detect that bits in the PDM-encoded audio stream follow the first pattern after a one-bit discontinuity;
      send a one to an audio sink at the one-bit discontinuity; and
      resume sending zeroes while the bits in the PDM-encoded audio stream resume following the first pattern.

12. The audio source of claim 11 integrated into a codec.

13. The audio source of claim 11 integrated into a microphone.

14. The audio source of claim 11, further comprising a buffer configured to store the bits of the PDM-encoded audio stream.

15. The audio source of claim 14, wherein the bit pattern encoding state machine comprises the buffer.

16. The audio source of claim 14, wherein the buffer is external to the bit pattern encoding state machine.

17. The audio source of claim 11, further comprising a multiplexer positioned between the bit pattern encoding state machine and the bus interface.

18. The audio source of claim 17, further comprising at least one other port coupled to the multiplexer.

19. An audio sink, comprising:
    a bus interface configured to be coupled to a non-return to zero-inverted (NRZI) audio bus;
    a pulse density modulated (PDM) output port; and
    a bit pattern decoding state machine coupled to the bus interface and the PDM output port, the bit pattern decoding state machine configured to:
      set a first state corresponding to a first pattern;
      while receiving zeroes from the NRZI audio bus through the bus interface, decode the zeroes as repeated instances of the first pattern;
      receive a pattern change indication from an audio source;
      change to a second state responsive to receiving the pattern change indication;
      detect a single one on the NRZI audio bus followed by plural zeroes; and
      treat the single one as a discontinuity in the second pattern and decode using the first pattern.

20. The audio sink of claim 19 incorporated into a speaker.

21. The audio sink of claim 19 incorporated into a codec.

* * * * *